United States Patent
Siriwongpairat et al.

(10) Patent No.: US 7,653,122 B2
(45) Date of Patent: Jan. 26, 2010

(54) METHOD AND SYSTEM FOR POWER CONTROLLED EFFECTIVE ALLOCATION OF SUB-BANDS IN ULTRA-WIDEBAND COMMUNICATION

(75) Inventors: Wipawee Siriwongpairat, College Park, MD (US); Zhu Han, Vienna, VA (US); K. J. Ray Liu, Potomac, MD (US)

(73) Assignee: University of Maryland, College Park, MD (US)

( * ) Notice: Subject to any disclaimer, the term of this patent is extended or adjusted under 35 U.S.C. 154(b) by 494 days.

(21) Appl. No.: 11/443,040

(22) Filed: May 31, 2006

(65) Prior Publication Data

US 2007/0091983 A1   Apr. 26, 2007

Related U.S. Application Data

(60) Provisional application No. 60/686,097, filed on Jun. 1, 2005.

(51) Int. Cl.
  *H04L 27/30* (2006.01)
(52) U.S. Cl. .................. 375/146; 375/256; 375/296; 370/318; 370/330; 370/348; 370/436; 370/437; 455/452.1; 455/522
(58) Field of Classification Search .............. 375/140, 375/141, 146, 256, 260, 295, 296; 370/318, 370/319, 321, 322, 330, 341, 348, 431, 436, 370/437; 455/450, 452.1, 43.4, 522, 427.1, 455/127.5
See application file for complete search history.

(56) References Cited

U.S. PATENT DOCUMENTS

| 6,128,350 | A  | * | 10/2000 | Shastri et al. | ............... 375/260 |
| 7,151,803 | B1 | * | 12/2006 | Sonalkar | ..................... 375/260 |
| 7,453,947 | B2 | * | 11/2008 | Kim et al. | ................... 375/267 |

OTHER PUBLICATIONS

M.Z. Win and R.A. Scholtz, "Impulse Radio: How It Works," IEEE Commun. Letters, vol. 2, No. 2, pp. 36-38, Feb. 1998.
M. L. Welborn, "System Considerations for Ultra-Wideband Wireless Networks," IEEE Radio and Wireless Conf., pp. 5-8, Aug. 2001.
J.R. Foerster, et al., "Intel CFP Presentation for a UWB PHY," IEEE P802.15-03/109r1, Mar. 3, 2003.
E. Saberinia and A. H. Tewfik, "Multi-User UWB-OFDM Communications," IEEE Proc. On Pacific Rim Conf. on Communic., Computers and Signal Processing, vol. 1, pp. 127-130, Aug. 2003.

(Continued)

*Primary Examiner*—Dac V Ha
(74) *Attorney, Agent, or Firm*—Rosenberg, Klein & Lee

(57) ABSTRACT

A power controlled sub-band assignment and power allocation among users in a multiband UWB system aims to reduce power consumption without compromising performance. The overall transmit power is minimized under the practical constraints, including packet error rate, transmission rate, and FCC regulations. To insure the system feasibility in variable channel conditions, an optimization scheme manages the assignment of UWB devices to respective channels subject to their suitability to the requested users' transmission rates. An inexpensive suboptimal approach reduces the complexity of the optimization procedure and achieves a comparable performance to those of the complex full search optimization routine. The suboptimal scheme obtains the feasible solutions adaptively when the channels assignment, initially calculated under the optimization criteria, is not feasible for the user's rate requirement.

20 Claims, 8 Drawing Sheets

OTHER PUBLICATIONS

A. Batra, et al., "Multi-Band OFDM Physical Layer Proposal for IEEE 802.15 Task Group 3a," IEEE P802.15-03/268r3, Mar. 2004.

Federal Communications Commission Report FCC 98-153 "Revision of Part 15 of the Commission's rules Regarding Ultra-Wideband Transmission Systems, First report and Order," Feb. 14, 2002.

IEEE 802.15WPAN High Rate Alternative PHY Task Group 3a (TG3a). Internet: www.ieee802.org/15/pub/TG3a.html.

J. Ellis, et al., "P802.15.3a Alt PHY Selection Criteria," IEEE P802.15-03/031r5, Dec. 27, 2002.

J. Ellis, et al., "TG3a Technical Requirements," IEEE P802.15-03/030r0, Dec. 27, 2002.

R. Fisher, et al., "DS-UWB Physical Layer Submission to 802.15 Task Group 3a," IEEE P802.15-0410137r3, Jul. 2004.

Y. Nakache, et al., "Low-Complexity Ultrawideband Transceiver with Compatibility to Multiband-OFDM," Technical report, A Mitsubishi Electronic Research laboratory. Internet: www.merl.com/reports/docs/ TR2004-051.pdf Jun. 2004.

J.R. Foerster, "Channel Modeling Sub-committee Report Final," IEEE P802.15-02/368r5-SG3a, Nov. 18, 2002.

A. A. M. Salet et al., "A statistical model for indoor multi-path propagation", IEEE on selected areas in communication, v. 5, No. 2, pp. 128-137, Feb. 1987.

* cited by examiner

METHOD AND SYSTEM FOR POWER CONTROLLED EFFECTIVE ALLOCATION OF SUB-BANDS IN ULTRA-WIDEBAND COMMUNICATION

RELATED APPLICATION DATA

This Utility Patent Application is based on the Provisional Patent Application Ser. No. 60/686,097 filed Jun. 1, 2005.

STATEMENT REGARDING FEDERALLY SPONSORED RESEARCH

The development of the invention described herein was funded by the U.S. Government through Air Force Office of Scientific Research (AFOSR), Contract #F4962002010217. The U.S. Government has certain rights in this invention.

FIELD OF THE INVENTION

The present invention is directed to an ultra-wideband (UWB) communication system, and particularly to an ultra-wideband system with sub-band assignment and power allocation optimization. The minimization of power consumption is attained under the constraints of packet error rate (PER), data transmission rate, and FCC (Federal Communications Commission) regulations.

In overall concept thereof, the present invention is directed to the optimization of the ultra-wideband system to insure the system feasibility at variable channel conditions which is achieved by managing the assignment of UWB devices to channels (sub-bands) and by controlling the transmission power.

The present invention further is directed to an ultra-wideband system which has low power consumption and is able to allocate the available resources of the UWB system to a variety of users with different service rates in an effective manner where an optimization scheme is applied to the UWB system to obtain feasible solutions adapted to channels conditions.

The present invention also is directed to the ultra-wideband multi-user, multi-sub-band system based on OFDM (Orthogonal Frequency Division Multiplexing) combined with time-frequency interleaving in which the sub-band assignment and power allocation is optimized in order to minimize the overall transmission power providing that all users achieve their requested transmission rates and desired packet error rate (PER), while the communication power spectral density complies with FCC regulations.

BACKGROUND OF THE INVENTION

Ultra-wideband (UWB) systems is an emerging technology that offers promise to satisfy the growing demand for low cost and high-speed digital wireless home networks. A traditional UWB technology is based on single-band systems (M. Z. Win and R. A. Scholtz, "Impulse Radio: How It Works," *IEEE Commun. Letters*, vol. 2, no. 2, pp. 36-38, February 1998; M. Z. Win and R. A. Scholtz, "Ultra-Wide-bandwidth Time-Hopping spread-Spectrum Impulse Radio for Wireless Multiple-Access Communications," *IEEE Trans. On Commun.*, vol. 48, no. 4, pp. 679-691, April 2000; M. L. Welborn, "System Considerations for Ultra-Wideband Wireless Networks," *IEEE Radio and Wireless Conf.*, pp. 5-8, August 2001; J. R. Foerster, "The Performance of a Direct-Sequence Spread Ultra Wideband system in the Presence of Multipath, Narrowband Interference, and Multiuser Interference," *IEEE Conf. on Ultra Wideband Systems and Technologies*, pp. 87-91, May 2002; Z. Feng and T. Kaiser, "On Channel Capacity of Multi-Antenna UWB Indoor Wireless Systems," *IEEE Int. Symposium on spread Spectrum Techniques and applications*, Sydney, Australia, Aug. 30-Sep. 2, 2004) that directly modulate data into a sequence of pulses which occupy the available bandwidth of 7.5 GHz. Recently, innovative multiband UWB schemes were proposed in (J. R. Foerster, et al., "Intel CFP Presentation for a UWB PHY," IEEE P802.15-03/109r1, Mar. 3, 2003; E. Saberinia and A. H. Tewfik, "Multi-User UWB-OFDM Communications," *IEEE Proc. On Pacific Rim Conf. on Communic., Computers and Signal Processing*, vol. 1, pp. 127-130, August 2003; J. R. Foerster, V. Somayazulu, S. Roy, "A Multibanded System Architecture for Ultra-Wideband Communications," *IEEE Conf. on Military Commun.*, vol. 2, pp. 903-908, Oct. 13-16, 2003; A. Batra, et al., "Multi-Band OFDM "Physical Layer Proposal for IEEE 802.15 Task Group 3a," IEEE P802.15-03/268r3, March 2004).

Instead of using the entire UWB frequency band to transmit information, multiband techniques divide the spectrum into several sub-bands. Each sub-band occupies a bandwidth of at least 500 MHz in compliance with the Federal Communications Commission (FCC) regulations (Federal Communications Commission Report FCC 98-153 "Revision of Part 15 of the Commission's rules Regarding Ultra-Wideband Transmission Systems, First report and Order," Feb. 14, 2002).

By interleaving the transmitted symbols across sub-bands, multiband UWB systems can still maintain the average transmit or transmission power as if a large GHz bandwidth is being used. The advantage is that the information can be processed over much smaller bandwidth, thereby reducing overall design complexity, as well as improving spectral flexibility and worldwide compliance.

A proposal for the IEEE 802.15.3a wireless personal area networking (WPAN) standard (IEEE 802.15WPAN High Rate Alternative PHY Task Group 3a (TG3a). Internet: www.ieee802.org/15/pub/TG3a.html) is based on multiband Orthogonal Frequency Division Multiplexing (OFDM), which utilizes a combination of OFDM and time-frequency interleaving (A Batra, et al, "Multi-Band OFDM Physical Layer Proposal for IEEE 802.15 Task Group 3a," IEEE P802.15-03/268r3, March 2004).

The OFDM technique is efficient at collecting multipath energy in highly dispersive channels, as is the case for most UWB channels. Time-frequency interleaving allows the OFDM symbols to be transmitted on different sub-bands. By using proper time-frequency codes, multiband UWB systems provide not only frequency diversity, but also multiple access capability (A. Batra, et al., "Design of a Multiband OFDM System for Realistic UWB Channel Environments," *IEEE Trans. On Microwave Theory and Techniques*, vol. 52, no. 9, pp. 2123-2138, September 2004).

To this date, most research efforts on multiband UWB systems have been devoted to the physical layer issues (A Batra, et al, "Multi-Band OFDM Physical Layer Proposal for IEEE 802.15 Task Group 3a," IEEE P802.15-03/268r3, March 2004; A. Batra, et al., "Design of a Multiband OFDM System for Realistic UWB Channel Environments," *IEEE Trans. On Microwave Theory and Techniques*, vol. 52, no. 9, pp. 2123-2138, Sep. 2004; E Saberinia, J. Tang, A. H. Tewfik, and K. K. Parhi, "Design and Implementation of Multi-Band Pulsed-OFDM System for Wireless Personal Area Networks," *IEEE Int. Conf on Commun.*, vol. 2, pp. 862-866, Jun. 20-24, 2004; Y. Nakache, et al., "Low-Complexity Ultrawideband Transceiver with Compatibility to Multiband- OFDM," Technical report, A Mitsubishi Electronic Research laboratory. Internet: www.merl.com/reports/docs/TR2004-051.pdf).

Nevertheless, research and development related to medium access techniques and cross layer design is still limited. Some of the key issues that remain largely unexplored are resource allocations such as power control and channel allocation. The multiband technique (A Batra, et al, "Multi-Band OFDM Physical Layer Proposal for IEEE 802.15 Task Group 3a," IEEE P802.15-03/268r3, March 2004) divides the sub-bands into groups, each comprising 2-3 sub-bands. A set of predetermined time-frequency codes is used to interleave the data within each band group. Each user's transmit power is equally distributed among his/her assigned sub-bands. This strategy lacks the ability to allocate sub-bands optimally since the available sub-bands are not assigned to each user according to his/her channel condition.

Since many applications enabled by UWB are expected to be in portable devices, low power consumption becomes a fundamental requirement. The low transmit power of UWB emissions not only ensures long life-time for the energy-limited devices but also reduces co-channel interference. There is a desire to design a proper cross layer scheme that allows UWB systems to operate at a low transmit power level, while still achieving desired performance. In addition, UWB systems are expected to support integration of multimedia traffic, such as voice, image, data, and video streams. This requires a cross layer scheme that is capable of allocating the available resources to a variety of users with different service rates in an effective way. An innovative design of multiband cross layer protocols is important to fully exploit the benefits of UWB systems.

Therefore, adaptive optimization of the sub-band assignment according to channels conditions and power control can greatly improve the system performance of multiband UWB.

SUMMARY OF THE INVENTION

It is therefore an object of the present invention to provide a novel channel allocation scheme for multiband multiuser UWB wireless systems which permits allocation of sub-bands as well as transmit power among a multiplicity of users in an effective manner, thus greatly reducing power consumption without compromising UWB systems performance.

It is another object of the present invention to provide sub-band assignment and power allocation optimization with the purpose of minimization of the overall transmit power in the UWB system provided that a plurality of users achieve their requested transmission rates and desired packet error rate (PER), with the power spectral density complying with FCC regulations.

It is still a further object of the present invention to provide a fast optimization (suboptimal) scheme for effective channel assignment and power allocation that obtains a near optimal solution combined with low computational complexity. The sub-optimal scheme is compatible with the transmit power savings of standard multiband schemes.

In order to ensure the system feasibility at variable channel conditions, it is a further object of the present invention to provide a joint rate assignment and power controlled channel allocation scheme that is able to allocate resources to users according to one of three different system optimization goals, namely either maximizing overall transmission rate, achieving proportional fairness, or reducing maximal transmission rate.

It is also an object of the present invention to facilitate the search for feasible solutions adapted to channel conditions when the UWB system is not feasible for the users' rate requirements.

The present invention represents a method for power efficient channel allocation in multi-band multi-user ultra-wideband (UWB) systems which are used by a plurality of K users, and where the spectrum is divided into a plurality of S sub-bands. Each $k^{th}$ of the plurality of K users requests transmission with a data transmission rate $R_k$. The UWB system employs OFDM with a plurality of N sub-carriers modulated by the Quadrature Phase Shift Keying (QPSK), wherein at each OFDM symbol period a modulated OFDM symbol is transmitted over one of the S sub-bands in time-interleaved fashion across the S sub-bands.

To optimize the channel assignment and power allocation, a sub-band assignment matrix A is defined which includes a plurality of $a_{ks}$ elements, wherein k=1, 2, ..., K, and s=1, 2, ..., S. The $a_{ks}$ represents the duration of a data packet which the $k^{th}$ user is allowed to transmit on the $s^{th}$ sub-band. A value range for each $a_{ks}$ is defined dependent on the data transmission rate $R_k$ of each $k^{th}$ user as well as on the duration of the transmission blocks.

Each sub-band from the plurality of S sub-bands is assigned to a respective user at a transmission event to minimize multiple access interference.

Further, a power allocation matrix P is defined which includes a plurality of $P_k^s$ elements, each denoting the transmit power of the $k^{th}$ user at each sub-carrier of the $s^{th}$ sub-band. The sub-band assignment matrix A and the power allocation matrix P are optimized under pre-defined constraints to minimize the overall transmit-power in said UWB system.

To obtain assignment of the $k^{th}$ user a respective sub-band in accordance with the sub-band condition, is provided in accordance with the following steps:

setting the sub-band assignment matrix $A=0_{K \times S}$;
establishing a user optimization list $K_{live}=\{1, 2, ..., K\}$;
defining sub-band optimization list $S_{live}=\{1, 2, ..., S\}$;

(a) calculating a dummy overall transmission power $P_{dummy}^k$ for each $k^{th}$ user of the plurality of k users, wherein $P_{dummy}^k = \min \Sigma_{s=1}^S a_{ks} P_k^s$, wherein $s \in S_{live}$;

(b) assigning the respective sub-band to a user k with the highest $P_{dummy}^k$, and removing the user k' from the user optimization list $K_{live}$;

(c) removing the assigned respective sub-band from the sub-band optimization list $S_{live}$;

(d) iteratively repeating the steps (a)-(c) for the rest of the users in the user optimization list $K_{live}$ until $K_{live}=0$, thus assigning users' transmissions to the rest of the sub-bands in the sub-band optimization list $S_{live}$;

(e) comparing a transmit power of each user for each assigned sub-band to a pre-determined maximum power value, and indicating an outage if the transmit power for any assigned sub-band is larger than a maximum power value allowed by FCC regulations, or if $S_{live}=0$, but $K_{live} \neq 0$.

If an outage is indicated, the optimization scheme adapts the requested data transmission rate $R_k$ to a lower value.

If, however, the transmit power does not exceed the maximum power value, optimal solutions are obtained for sub-band assignment matrix A and power allocation matrix P.

In order to adapt the requested data transmission rate $R_k$ in the "outage" situation, a single $k^{th}$ user is selected from the user optimization list, and, his/her data transmission rate is reduced to a one-step reduced data transmission rate $\bar{R}_k$. Further, the steps (a)-(e) are iteratively repeated for all the users.

The candidate user for reduction of the transmission rate is chosen in accordance with the UWB system performance goals such as either maximization of the transmission rate of the entire UWB system, or subject to the proportional fairness approach (wherein the product of transmission rates requested by all the user's minus minimal rate requirement is maximized); or subject to a reduction of the maximal transmission rate approach.

The present invention additionally is a multi-user multiband ultra-wideband (UWB) system with an efficient sub-band and power allocation scheme. The UWB system transmits data packets from a plurality of K users at a plurality of S sub-bands using Orthogonal Frequency Division Multiplexing (OFDM) with a plurality of N sub-carriers. The subject UWB system comprises:

a sub-band assignment matrix A, which includes a plurality of $a_{ks}$ elements, wherein k=1, 2, ..., K, and S=1, 2, ..., S, and where each $a_{ks}$ element represents the number of OFDM symbols that a user k is allowed to transmit on the $s^{th}$ sub-band during two OFDM symbol periods;

a power allocation matrix P which includes a plurality of $P_k^s$ elements, each denoting the transmit power of the $k^{th}$ user at the $n^{th}$ sub-carrier of the $s^{th}$ sub-band;

a user optimization list $K_{live}=\{1, 2, \ldots, K\}$;

a sub-band optimization list $S_{live}=\{1, 2, \ldots, S\}$, and a processor unit for calculation of optimization parameters for the sub-band assignment matrix A and the power allocation matrix P adaptively to transmission channels conditions.

The processor unit first calculates a dummy overall transmission power $P_{dummy}^k$ for each $k^{th}$ user, wherein $P_{dummy}^k = \min \Sigma_{s=1}^{S} a_{ks} P_k^s$, $s \in S_{live}$. Then the processor assigns the sub-bands to a user k' with the highest $P_{dummy}^k$ in accordance with $a_{ks}$, and removes the user k from the user optimization list $K_{live}$.

Further, the processor unit removes the assigned sub-band from the sub-band optimization list $S_{live}$ if the sub-band is assigned twice. These operations are iteratively repeated for the rest of the users in the user optimization list $K_{live}$, until $K_{live}=0$, thus formulating the assignment of transmissions for all users to all sub-bands in the sub-band optimization list $S_{live}$.

If the obtained transmission power $P_{dummy}^k$ for each sub-band does not exceed the pre-determined maximum power value, the processor unit has found optimal (or acceptable sub-optimal) parameters for the matrixes A and P.

If however the transmission power for any assigned sub-band is larger than a pre-determined maximum power value (or if $S_{live}=0$ and $K_{live}\neq 0$), the processor unit performs re-calculation at a reduced requested data transmission rate $\bar{R}_k$ for at least one user, thus adapting the channel assignment to the channels conditions.

These and other objects and advantages of the present invention will become apparent four further description of the preferred embodiment in conjunction with the drawings.

DESCRIPTION OF THE PREFERRED EMBODIMENTS

Figure 1:
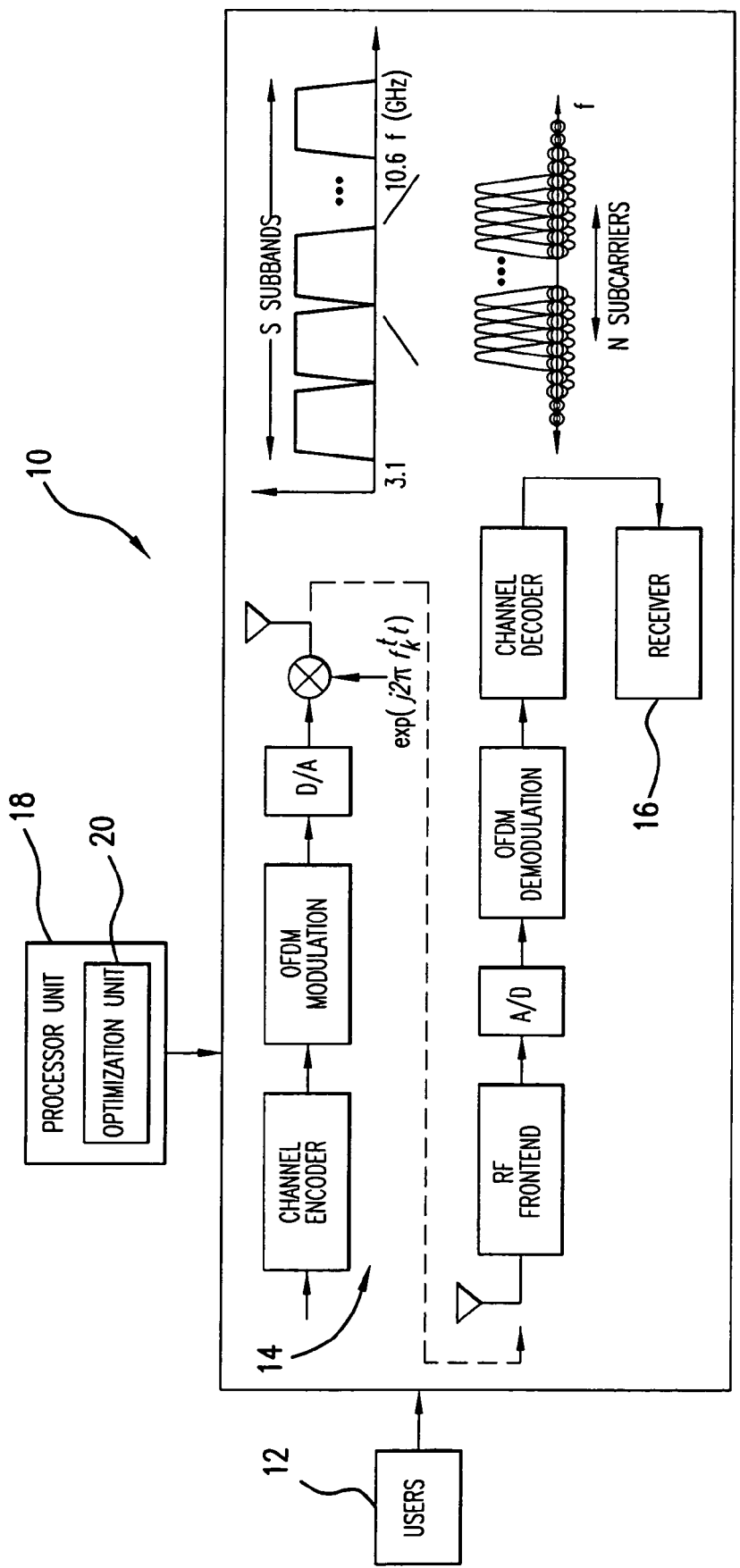
FIG. 1 is a schematic representation of the multi-band UWB system of the present invention.

Referring to FIG. 1, UWB system 10 operates in the UWB spectrum, for example, from 3.1 GHz to 10.6 GHz, which is divided into S sub-bands. Each sub-band may occupy a bandwidth of at least 500 MHz in compliance with the Federal Communications Commission (FCC) regulations. The UWB system employs an Orthogonal Frequency Division Multiplexing (OFDM) technique with N subcarriers, which are modulated using Quadrature Phase Shift Keying (QPSK).

The OFDM is a transmission technique based upon frequency-division multiplexing where multiple signals are sent out at different frequencies. As a spread spectrum technique, it combines good noise resistance, immunity to reflections, and efficient use of the spectrum. OFDM uses a composite of narrow channel bands (sub-carriers) to enhance its performance in high frequency bands in urban and rural applications where building clutter and foliage may negatively impact the propagation of radio waves.

At each OFDM symbol period, the modulated symbol is transmitted over one of the S sub-bands. These symbols are time-interleaved across the sub-bands. Different bit rates are achieved by using different channel coding, frequency spreading, or time spreading rates. The frequency domain spreading may be obtained by choosing conjugate symmetric inputs to the Inverse Fast Fourier Transform (IFFT). The time-domain spreading may be achieved by repeating the same information in an OFDM symbol on several, for example, two, different sub-bands, as described in A. Batra, et al., "Multi-band OFDM Physical Layer Proposal for IEEE 802.15 Task Group 3a", IEEE P802.15-03/268r3 March 2004. In the USB system 10, a plurality of users 12 transmit data (blocks, packets), via an assigned channel 14 at specified transmission rates $R_k$ to a receiver 16, which combines the information transmitted via different times or frequencies to increase the signal-to-noise ratio (SNR) of received data.

Table 1 specifies transmission rate dependent parameters of the UWB system 10.

TABLE I

Rate-Dependent Parameters

| Data Rate (Mbps) | Modulation | Coding Rate | Conjugate Symmetric Inputs to IFFT | Time Spreading Factor |
| --- | --- | --- | --- | --- |
| 53.3 | QPSK | 1/3 | Yes | 2 |
| 55 | QPSK | 11/32 | Yes | 2 |
| 80 | QPSK | 1/2 | Yes | 2 |
| 106.7 | QPSK | 1/3 | No | 2 |
| 110 | QPSK | 11/32 | No | 2 |
| 160 | QPSK | 1/2 | No | 2 |
| 200 | QPSK | 5/8 | No | 2 |
| 320 | QPSK | 1/2 | No | 1 |
| 400 | QPSK | 5/8 | No | 1 |
| 480 | QPSK | 3/4 | No | 1 |

As identified in Table I, the multiband UWB system may provide data transmission rates ranging from 53.3 Mbps to 480 Mbps. For rates not higher than 80 Mbps, both time and frequency spreadings may be performed, yielding an overall spreading gain of 4. In case of rates between 106.7 and 200 Mbps, only time-domain spreading is utilized which results in the overall spreading gain of 2. The system with information rates higher than 200 Mbps exploits neither frequency nor time spreading, and its overall spreading gain is 1. Forward error correction codes with coding rates of ⅓, 11/32, ½, ⅝ or ¾ may be employed to provide different channel protections with various information data rates.

The model of the channels 14 in the UWB system 10 shown in FIG. 1, can be presented in accordance with the following principles:

The channel model specified in the IEEE 802.15.3a standard (J. R. Foerster, et al., "Intel CFP Presentation for a UWB PHY," IEEE P802.15-03/109r1, Mar. 3, 2003) is a modified version of the Saleh-Valenzuela (SV) model for indoor channels (A. A. M. Salet et al., "A statistical model for indoor multi-path propagation", IEEE on selected areas in communication, v. 5, no. 2, pp. 128-137, February 1987). The channel impulse response for the $k^{th}$ user at time t can be represented by $$h_k(t) = X_k \sum_{m=0}^{M_k} \sum_{l=0}^{L_k} \alpha_k(m,l)\delta(t - T_k(m) - \tau_k(m,l)), \tag{1}$$

where $X_k$ is the log-normal shadowing, and $\alpha_k(m,l)$ denotes the gain of the $l^{th}$ multipath component in the $m^{th}$ cluster. The time duration $T_k(m)$ represents the delay of the $m^{th}$ cluster, and $\tau_k(m,l)$ is the delay of the $l^{th}$ path in the $m^{th}$ cluster relative to the cluster arrival time.

The cluster arrivals and the path arrivals within each cluster can be modeled as Poisson distribution with rate $\Lambda_k$ and rate $\lambda_k$ ($\lambda_k > \Lambda_k$), respectively. The path amplitude $|\alpha_k(m,l)|$ follows the log-normal distribution, whereas the phase $L\alpha_k(m,l)$ is a uniform random variable over $(0,2\pi)$. The model parameters corresponding to several scenarios are provided in (J. R. Foekster et al., "A multi-band system architecture for Ultra-Wideband Communications", IEEE Conf. on Military Commun.", vol 2, pp. 903, Oct. 13-16, 2003). With the choice of cyclic prefix length greater than the duration of the channel impulse response, OFDM permits each UWB sub-band to be divided into a set of N orthogonal narrowband channels. The baseband frequency response at the $n^{th}$ (n=0, 1, ..., N−1) subcarrier is given by $$H_k(n) = X_k \sum_{m=0}^{M_k} \sum_{l=0}^{L_k} \alpha_k(m,l) e^{-j2\pi n\Delta f(T_k(m)+\tau_k(m,l))}, \tag{2}$$

where $j=\sqrt{-1}$, and $\Delta f$ is the frequency separation between two adjacent subcarriers. It is worth noting that for most WPAN applications, the transmitter and receiver are stationary. As a result, the UWB channel slowly fades. The standard channel model assumes that the channel stays either completely static, or is time-invariant during the transmission of each packet.

A model of system 10 includes a multiuser multiband UWB scenario where K users 12 simultaneously transmit their information. The $k^{th}$ user has the transmission rate $R_k$, which may be any value specified in Table I. As shown in Table I, if the transmission rate is higher than 200 Mbps, there is no time spreading; otherwise, a time-domain spreading operation is performed with a spreading factor of two. In this case, any time-frequency code with a period of two may guarantee that each user will achieve the additional diversity by transmitting the same information over two OFDM blocks. The time-frequency codes with period longer than two may also be used to improve the multiple access capability for asynchronous UWB wireless networks. To simplify the understanding of the principles of the present invention, a multiband UWB system is analyzed herein which employs time-frequency codes of length two. However, the extension to UWB systems with longer time-frequency codes is straight forward and clearly falls in the scope of the present invention.

The multi-user multi-band UWB system 10 of the present invention, as shown in FIG. 1, is efficiently managed by the processor unit 18 to provide a highly efficient sub-band assignment and power allocation in the system 10 and to ensure the system feasibility in variable conditions of the channels 14. For this purpose, the system 10 is equipped with the optimization unit 20 which operates to minimize the power consumption in the system 10 under the constraints of the packet error rate (PER), transmission rate, and FCC regulations. The processor unit 20 operates in accordance with the process presented by the flow chart illustrated in FIGS. 2-4.

Figure 2:
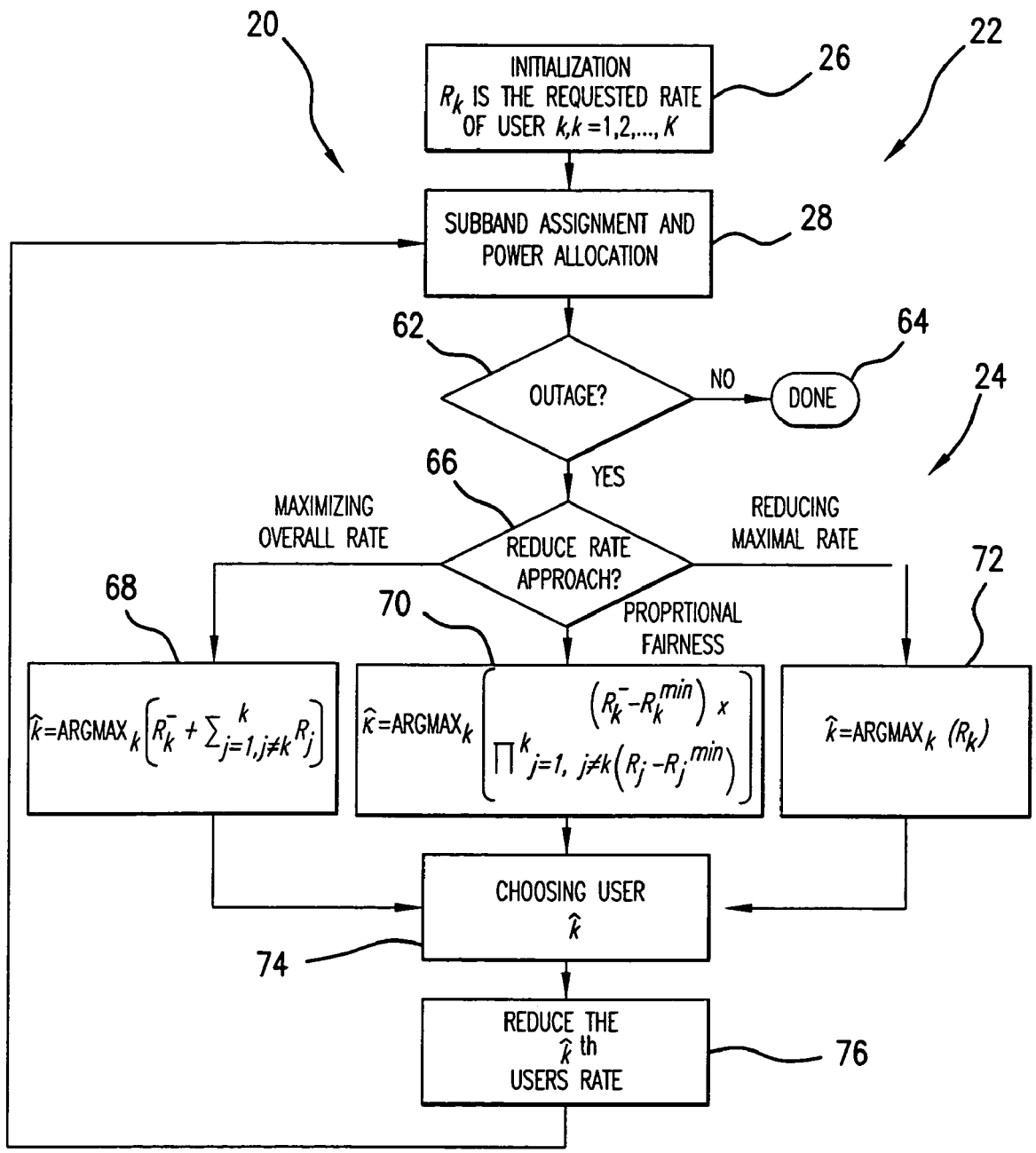
FIG. 2 is a flow-chart block diagram of the joint adaptive rate assignment and resource allocation scheme of the present invention.

As shown in FIG. 2, the optimization procedure carried out in the optimization unit 20 comprises two main stages, namely the resource allocation stage 22 and the rate adaptation stage 24 which is carried out if the result of the sub-band assignment and power allocation procedure are not satisfactory, due for example, to either the user's requested rates are too high or the channel conditions are poor. In this scenario, the requested transmission rates cannot be satisfied, thereby indicating the non-feasibility of the system. When the system is not feasible, the initially requested transmission rates must be adapted in order to obtain feasible solutions which are carried out in the rate adaptation stage 24 of the procedure shown in FIG. 2.

Figure 3:
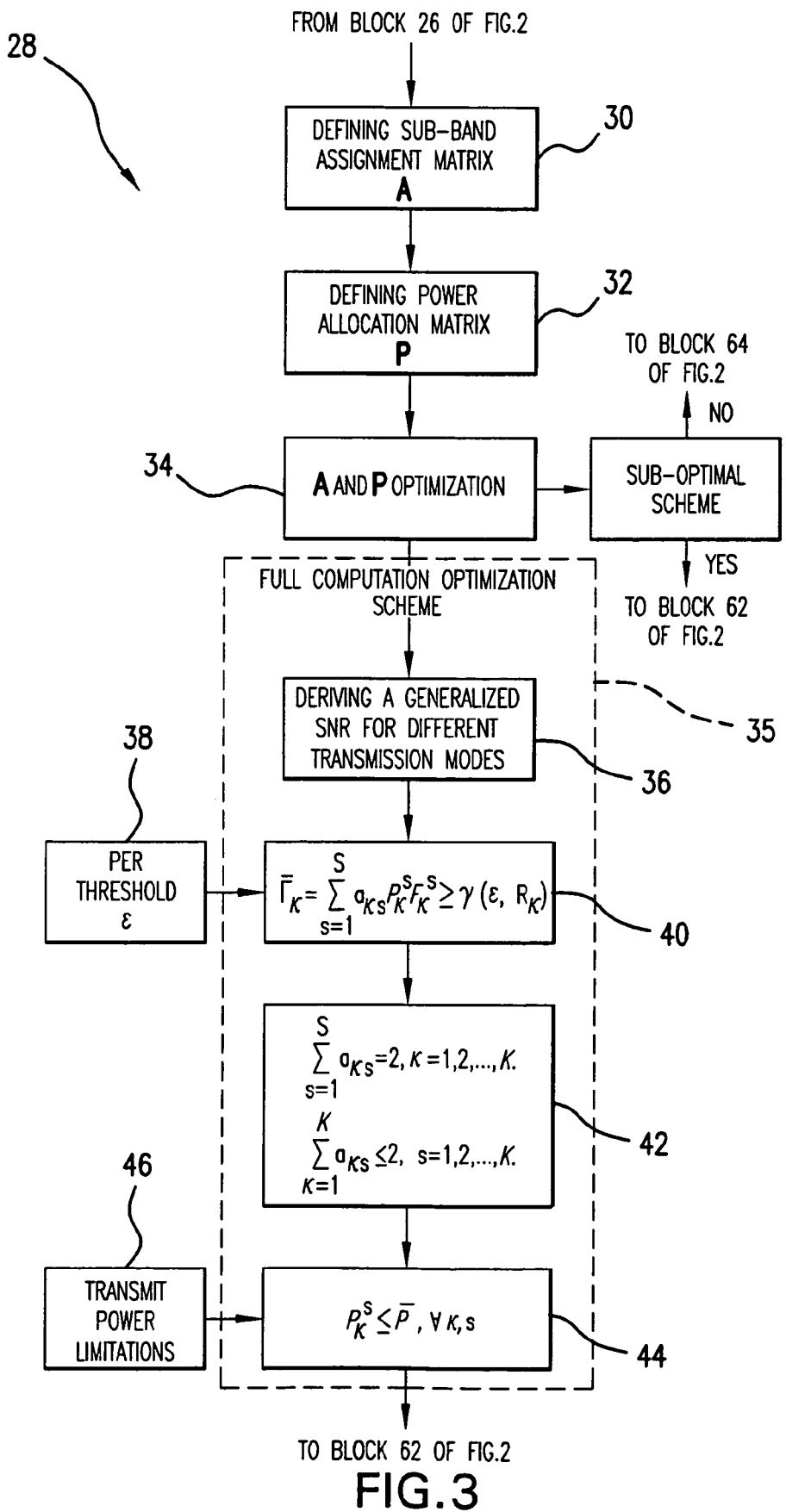
FIG. 3 is a flow-chart block diagram of the sub-band assignment and power allocation routine of the present invention.

As the initial step, carried out in the "Initialization" block 26, the $k^{th}$ user's data transmission rate $R_k$, k=1, 2, ..., K, is set to the user's requested rate. After the initial setting, the procedure follows to the "Sub-band Assignment and Power Allocation" block 28 to perform the operation, detailed in FIG. 3. Referring to FIG. 3, the sub-band assignment and power allocation routine starts with defining a sub-band assignment matrix A in block 30.

In order to specify which frequency-bands each user is permitted to transmit his/her information, a K×S assignment matrix A is defined, whose (k, s)$^{th}$ element is denoted by, $a_{ks}$, for k=1, 2, ..., K and s=1, 2, ..., S. This $a_{ks}$ represents the number of OFDM symbols that a user k is allowed to transmit on the $s^{th}$ sub-band during two OFDM symbol periods. Assuming that each user uses one sub-band per transmission, $a_{ks}$ may take any value from the set $\{0, 1, 2\}$. However, when the $k^{th}$ user's transmission rate is less than or equal to 200 Mbps, band hopping is performed to obtain the diversity from time spreading. In this case, $a_{ks}$ is restricted to $a_{ks} \in \{0,1\}$. Thus, the element of assignment matrix satisfies $$a_{ks} \in \phi(R_k) = \begin{cases} \{0,1\}, & R_k \leq 200 \text{ Mbps}; \\ \{0,1,2\}, & R_k > 200 \text{ Mbps}. \end{cases} \tag{3}$$

During each OFDM symbol period, one user will occupy one sub-band. Since the duration of two OFDM blocks is considered for the sake of simplicity, the assignment strategy satisfies:

$$\sum_{s=1}^{S} a_{ks} = 2, k = 1, 2, \ldots, K. \quad (4)$$

In addition, to minimize the multiple access interference, each sub-band is assigned to a specific user at a time, and hence each sub-band may be used at most twice during two OFDM symbol periods. Therefore, the sub-band assignments also follows:

$$\sum_{k=1}^{K} a_{ks} \leq 2, s = 1, 2, \ldots, S. \quad (5)$$

Let $P_k^n(n)$ denote the $k^{th}$ user's transmit power at subcarrier n of the $s^{th}$ sub-band. Accordingly, the signal-to-noise ratio (SNR) of the user k at the $s^{th}$ sub-band and the $n^{th}$ subcarrier is given by;

$$\Gamma_k^s(n) = \frac{P_k^s(n) G_k^s(n)}{\sigma_k^2}, \quad (6)$$

where $G_k^s(n)$ is the corresponding channel gain.

$$G_k^s(n) = |H_k^s(n)|^2 \left(\frac{4\pi d_k}{\lambda_k^s}\right)^{-\nu}, \quad (7)$$

in which $H_k^s(n)$ is the channel frequency response at sub-band s and subcarrier n, v is the propagation loss factor, $d_k$ represents the distance between the transmitter and receiver, $\lambda_k^s = 3 \times 10^8 / f_{c,k}^s$ is the wavelength of the transmitted signal, and $f_{c,k}^s$ is the center frequency of the waveform. In the Eq. 6, $\sigma_k^2$ denotes the noise power at each subcarrier, which is defined as $$\sigma_k^2 = 2 \times 10^{(-174 = 10 \log_{10}(R_k) + N_F)/10}, \quad (8)$$

where $R_k$ is the $k^{th}$ user's data transmission rate, and $N_F$ is the received noise figure referred to the antenna terminal. As in the multiband standard, it is assumed that the noise power $\sigma_k^2$ is the same for every subcarrier within each sub-band.

In the simple transceiver of UWB, the current standard assumes that there is no bit loading and the power is equally distributed across subcarriers within each sub-band. Similarly, it is assumed that $P_k^s(n) = P_k^s(n')$ for any $0 \leq n, n' \leq N-1$. Denoting $$P_k^s(n) = P_k^s, n = 0, 1, \ldots, N-1, \quad (9)$$

then the K×S power allocation matrix P is defined, as $[P]_{ks} = P_k^s$, in which $(k, s)^{th}$ component represents the $k^{th}$ user's transmit power in sub-band s. The power allocation matrix P is defined in block 32 "Defining a Power Allocation Matrix P"

In a multiband frequency band plan, the sub-band center frequencies span a wide range from 3.43 GHz to 10.3 GHz. Consequently, different sub-bands tend to undergo different fading and propagation loss. Additionally, the channel condition for a specific sub-band may be good for more than one user. Therefore, in order to efficiently reduce the power consumption, the sub-band assignment matrix A defined in block 30 and power allocation matrix P defined in block 32 are to be optimized in accordance with practical constraints.

For this purpose, the procedure flows to the block 34 "A and P optimization," in which a generalized SNR expression is to be derived for various UWB transmission modes, and a necessary condition is provided for the SNR so as to satisfy the PER requirement. The overall transmit power is to be minimized, provided that all users 12 achieve their requested transmission rates and desired PER, while the transmit power level is below the FCC limitation and rate parameters are in accordance with the standard specified in Table I.

The full computation A and P optimization scheme is carried out in block 35, which starts in "Deriving a Generalized SNR for Different Transmission Rates" block 36 to derive the Generalized SNR for Different Transmission Modes. Assuming that the channel state information is known at the receiver, the receiver employs a maximum ratio combiner (MRC) to combine the information transmitted via different times or frequencies. As a result, the average SNR at the output of MRC depends not only on the channel coding rate, but also the time and frequency spreading factors. The optimization procedure provides a generalized expression of the average SNR for any data transmission rate.

Assuming maximum ratio combining and $P_k^s(n) = P_k^s$ for all subcarriers n, then the $k^{th}$ user's average SNR is given by $$\Gamma_k = \sum_{s=1}^{S} a_k P_k^s F_k^s, \quad (10)$$

where $$F_k^s \triangleq \frac{b_k}{N \sigma_k^2} \sum_{n=0}^{N-1} G_k^s(n), \quad (11)$$

and $b_k$ is a constant that depends on the $k^{th}$ user's information data rate as follows:

$$b_k = \begin{cases} 2, & R_k \leq 80 \text{ Mbps}; \\ 1, & 80 < R_k \leq 200 \text{ Mbps}; \\ 1/2, & R_k > 200 \text{ Mbps}. \end{cases} \quad (12)$$

This is supported by the following consideration: when $R_k$ is not higher than 80 Mbps, the information is spread across both time and frequency with the overall spreading gain of four, then the total SNR for the $k^{th}$ user at subcarrier n, n=0, 1, ..., N/2-1, is $$\Gamma_k(n) = \sum_{s=1}^{S} a_{ks} [\Gamma_k^s(n) + \Gamma_k^s(n + N/2)]. \quad (13)$$

By averaging Eq. 13 over N/2 subcarriers, the average SNR is obtained:

$$\bar{\Gamma}_k = \frac{1}{N/2}\sum_{n=0}^{N/2-1}\Gamma_k(n) = \frac{1}{N/2}\sum_{n=0}^{N-1}\sum_{s=1}^{S}a_{ks}\Gamma_k^s(n). \quad (14)$$

By substituting Eq. 6 into Eq. 14 and assuming $P_k^s(n)=P_k^s$, the average SNR is obtained:

$$\bar{\Gamma}_k = \frac{2}{N}\sum_{n=0}^{N-1}\sum_{s=1}^{S}a_{ks}P_k^s\frac{G_k^s(n)}{\sigma_k^2} = \sum_{s=1}^{S}a_{ks}P_k^s\left(\frac{2}{N\sigma_k^2}\sum_{n=0}^{N-1}G_k^s(n)\right) \quad (15)$$

When $R_k$ is between 106.7 and 200 Mbps, only time spreading is performed, and hence the total SNR, at subcarrier n, n=0, 1, ..., N−1, becomes $$\Gamma_k(n) = \sum_{s=1}^{S}a_{ks}\Gamma_k^s(n) = \sum_{s=1}^{S}a_{ks}\frac{P_k^s(n)G_k^s(n)}{\sigma_k^2}. \quad (16)$$

Thus, the average SNR can be obtained from Eq. 16 as $$\bar{\Gamma}_k = \frac{1}{N}\sum_{n=0}^{N-1}\Gamma_k(n) = \sum_{s=1}^{S}a_{ks}P_k^s\left(\frac{1}{N\sigma_k^2}\sum_{n=0}^{N-1}G_k^s(n)\right). \quad (17)$$

For $R_k$ higher than 200 Mbps, there is no spreading and the $k^{th}$ user's average SNR is simply the average of $\Gamma_k^s(n)$ over N subcarriers and two sub-bands, i.e., $$\bar{\Gamma}_k = \frac{1}{2N}\sum_{n=0}^{N-1}\sum_{s=1}^{S}a_{ks}\Gamma_k^s(n) = \sum_{s=1}^{S}a_{ks}P_k^p\left(\frac{1}{2N\sigma_k^2}\sum_{n=0}^{N-1}G_k^s(n)\right) \quad (18)$$

Expressing Eqs. 15-18 in terms of $F_k^s$ defined in Eq. 11, leads to the results in Eq. 10.

A common performance requirement of UWB systems is to offer packet transmission with an error probability less than a desired threshold value. The packet error rate (PER) is directly related to the bit error rate (BER) performance, which in turn depends on the SNR at the output of the MRC. By keeping the SNR level higher than a specific value, the PER is lower than the PER threshold which is entered from the block 38 "PER threshold". A necessary condition for the average SNR so as to satisfy the PER requirement is presented in the following paragraphs.

If the maximum PER is $\epsilon$ and the packet length is L bits, then the bit error probability after the channel decoder for the $k^{th}$ user, $P_k$, satisfies:

$$1-(1-P_k)^L \leq \epsilon. \quad (19)$$

Assuming the use of convolutional coding and Viterbi decoding with perfect interleaving, $P_k$ is given as $$P_k \leq \sum_{d=d_{free}}^{\infty} a_d P_k(d), \quad (20)$$

where $d_{free}$ is the free distance of the convolutional code, $a_d$ denotes the total number of error events of weight d, and $P_k(d)$ represents the probability of choosing the incorrect path with distance d from the correct path. Assume hard-decision decoding, then $P_k(d)$ is related to the average BER, $\bar{B}_k$, as $$P_k(d) = \begin{cases} \sum_{l=(d+1)/2}^{d} C(d,l)\bar{B}_k^l(1-\bar{B}_k)^{d-l}, \\ \sum_{l=d/2+1}^{d} C(d,l)\bar{B}_k^l(1-\bar{B}_k)^{d-l} + \frac{1}{2}C\left(d,\frac{d}{2}\right)\bar{B}_k^{\frac{d}{2}}(1-\bar{B}_k)^{\frac{d}{2}}, \end{cases} \quad (21)$$

where $C(d,l) \triangleq d!/[l!(d-l)!]$ is the combinatorial function. The average BER $\bar{B}_k$ can be obtained by averaging the conditional BER over the probability density function of the SNR at the output of MRC. The $\Gamma_k$ denotes the instantaneous SNR at the MRC output, the conditional BER is given by $$B_k(\Gamma_k) = Q(\sqrt{\Gamma_k}), \quad (22)$$

where $Q(\cdot)$ is the Gaussian error function. From Eqs. 19-20, it is seen that for a given value of PER threshold $\epsilon$, a corresponding BER threshold can be obtained. Since the error probability $P_k$ in Eq. 20 is related to the coding rate through the parameters $d_{free}$ and $a_d$, the BER requirement depends not only on the value of $\epsilon$, but also on the data rate $R_k$. This implies that the SNR threshold is a function of both $\epsilon$ and $R_k$. Let $\gamma(\epsilon, R_k)$ be the $k^{th}$ user's minimum SNR that is required to achieve the data rate $R_k$ with PER $<\epsilon$. Thus, the necessary condition for the average SNR (defined in Eq. 10) to satisfy the PER requirement is given by $$\bar{\Gamma}_k = \sum_{s=1}^{S} a_{ks} P_k^s F_k^s \geq \gamma(\epsilon, R_k). \quad (23)$$

The goal of the optimization procedure is to minimize the overall transmit power subject to the PER transmission rates, and FCC regulation constraints. Recalling from Eq. 3 that the assignment matrix A has $a_{ks} \in \phi(R_k)$, $\forall k,s$, the optimization criteria are formulated as follows:

$$\min_{A,P} P_{sum} = \sum_{k=1}^{K}\sum_{s=1}^{S} a_{ks} P_k^s \quad (24)$$

-continued $$s.t. \begin{cases} \text{Rate and PER:} \sum_{s=1}^{S} a_{ks} P_k^s F_k^s \geq \gamma(\varepsilon, R_k), \forall k; \\ \text{Assignment (4):} \sum_{s=1}^{S} a_{ks} = 2, \forall k; \\ \text{Assignment (5):} \sum_{k=1}^{K} a_{ks} \leq 2, \forall s; \\ \text{Power:} P_k^s \leq \overline{P}, \forall k, s, \end{cases}$$

In order to satisfy the first constraint in Eq. 24, e.g. to ensure transmission rate and PER requirements the optimization procedure flows to Block 40

$$\text{"}\Gamma_k = \sum_{s=1}^{S} a_{ks} P_k^s F_k^s \geq \gamma(\varepsilon, R_k)\text{"}$$

where the optimization is carried out based on Eq. 23. Further, the flow chart passes to block 42

$$\text{"}\sum_{s=1}^{S} a_{ks} = 2, k = 1, 2, \ldots, K \text{ and } \sum_{k=1}^{K} a_{ks} \leq 2, s = 1, 2, \ldots, S\text{"}$$

to satisfy Eqs. 4 and 5. From block 42, the logic follows to block 44 "$P_k^s \leq \overline{P}$, $\forall k, s$", where the optimization is carried out to satisfy the limitation on transmit power spectral density of −41.3 dBm/MHz, according to FCC Part 15 rules. (Federal Communications Commission Report FCC98-153 "Revision of Part 15 of the Commission's Rules Regarding Ultra-Wideband Transmission Systems First Report and Order," Feb. 14, 2002). The transmit power limitations are introduced in Block 44 from the block 46. Here $\overline{P}$ is the maximum power after taking into consideration effects such as peak-to-average ratio.

If the elements in the assignment matrix A defined in block 30 are binary, the problem defined in Eq. 24 can be viewed as a generalized form of a generalized assignment problem which is NP hard (nondeterministic in polynomial time). Since the components of A can be 0, 1, or 2, the problem is an even more difficult integer programming problem. Thus the existing channel assignment approaches may not be applicable in Eq. 24. Although an optimal solution may be found through a full search in block 35 "Full Computation Optimization Scheme" of FIG. 3, this is computationally expensive. To overcome the complexity issue, the sub-band assignment and power allocation optimization is carried out in accordance with a fast suboptimal scheme, which is near optimal but has very low computational complexity. To carry out the sub-optimal routine, the logic flows from block 34 to block 50 "Sub-Optimal Scheme" which is presented in detail in FIG. 4.

The basic idea is to assign $a_{ks}$ for a user, step by step, so that power consumption is minimized. The sub-optimal scheme is initialized in block 52, "Initialization" to set $A=0_{K \times S}$, to define the user optimization list $K_{live}=\{1, 2, \ldots, K\}$, and also to define the sub-band optimization list $S_{live}=\{1, 2, \ldots, S\}$. First, each user hypothesizes that he/she can assign his/her transmission into different sub-bands subject to the absence of other users in these sub-bands. For each hypothesis, a dummy overall transmission power $P_{dummy}^k$ is calculated in block 54 "Calculate $P_{dummy}^k$". The user with the highest dummy overall transmit power is selected in block 55 "Select $k^{th}$ user with highest $P_{dummy}^k$". The user with the highest dummy overall transmit power will be assigned first, so that the best channel is assigned to the user that can reduce the overall power most.

Then, the A and P are updated and this user is removed from the optimization list $K_{live}$ in block 56 "Update A and P and remove the $k^{th}$ user having the highest $P_{dummy}^k$". Since each sub-band can only accommodate one user per symbol period, and two OFDM symbol periods are considered, then, when a sub-band is assigned twice, this sub-band is removed from the optimization list $S_{live}$ in the block 58 "Remove the Assigned Sub-Band". The procedure flows to block 60 "Is $K_{live}=0$? Or Is $S_{live}=0$?" If not all users are assigned to the channels, then the routine loops back to block 54 to repeat calculations for the rest of the users in the user optimization list $K_{live}$ to assign their transmissions into the remaining sub-bands.

This iteration is continued until all users are assigned with their sub-bands, i.e., $K_{live}=\emptyset$. Finally, when $K_{live}=0$, the logic flows to the block 62 "Outage?" of FIG. 2 to check if the maximum transmit power corresponding to calculation results, is larger than the FCC establishing power limitation (which is supplied from block 46). If "Yes"; an outrage is reported and the logic flows to block 66 of FIG. 2; otherwise, the final values of A and P are obtained, and the routine ends in block 64 of FIG. 2.

The suboptimal scheme shown in FIG. 4 may be described as follows:

Initialization: $a_{ks}=0$, $\forall k, s$, $K_{live}=\{1, \ldots, K\}$, $S_{live}=\{1, \ldots, S\}$ Iteration: Repeat until $K_{live}=\phi$ or $S_{live}=\phi$ 1) For, $k \in K_{live}$ $P_{dummy}^k = \min \Sigma_{s=1}^{S} a_{ks} P_k^s$ s.t. $a_{ks} \in S_{live}$ End 2) Select k' with the maximal $P_{dummy}^k$, $\forall k$, assign the corresponding $a_{k's}$ to A, and update P.

3) $K_{live}=K_{live} \backslash k'$

4) If $\Sigma_{k=1}^{K} a_{ks'}=2$, $S_{live}=S_{live} \backslash s'$, $\backslash s'$ End: If $(\max(P) > \overline{P})$ or $(S_{live}=\phi$ and $K_{live} \neq \phi)$, an outage is reported.

Otherwise, return A and P.

The complexity of the proposed suboptimal scheme is only $O(K^2 S)$. Although the procedure is "suboptimal", simulation results illustrated in the following paragraphs shows that the proposed fast suboptimal routine has very close performance characteristics with respect to optimal solutions obtained by full search. Another complexity issue is that for the proposed scheme, power control is needed for each sub-band. This will increase the system complexity slightly, but from the simulation results, it may be seen that performance improvement is significant. Additionally, the proposed optimization scheme may be implemented by the master node to manage the power and sub-bands usages of all users in a UWB pico-cell system, as required in the IEEE 802.15.3a standard (IEEE 802.15 WPAN High Rate alternative PHY Task Group 3a (TG3a), www.ieee802.org/15/pub/TG3a.html).

Figure 4:
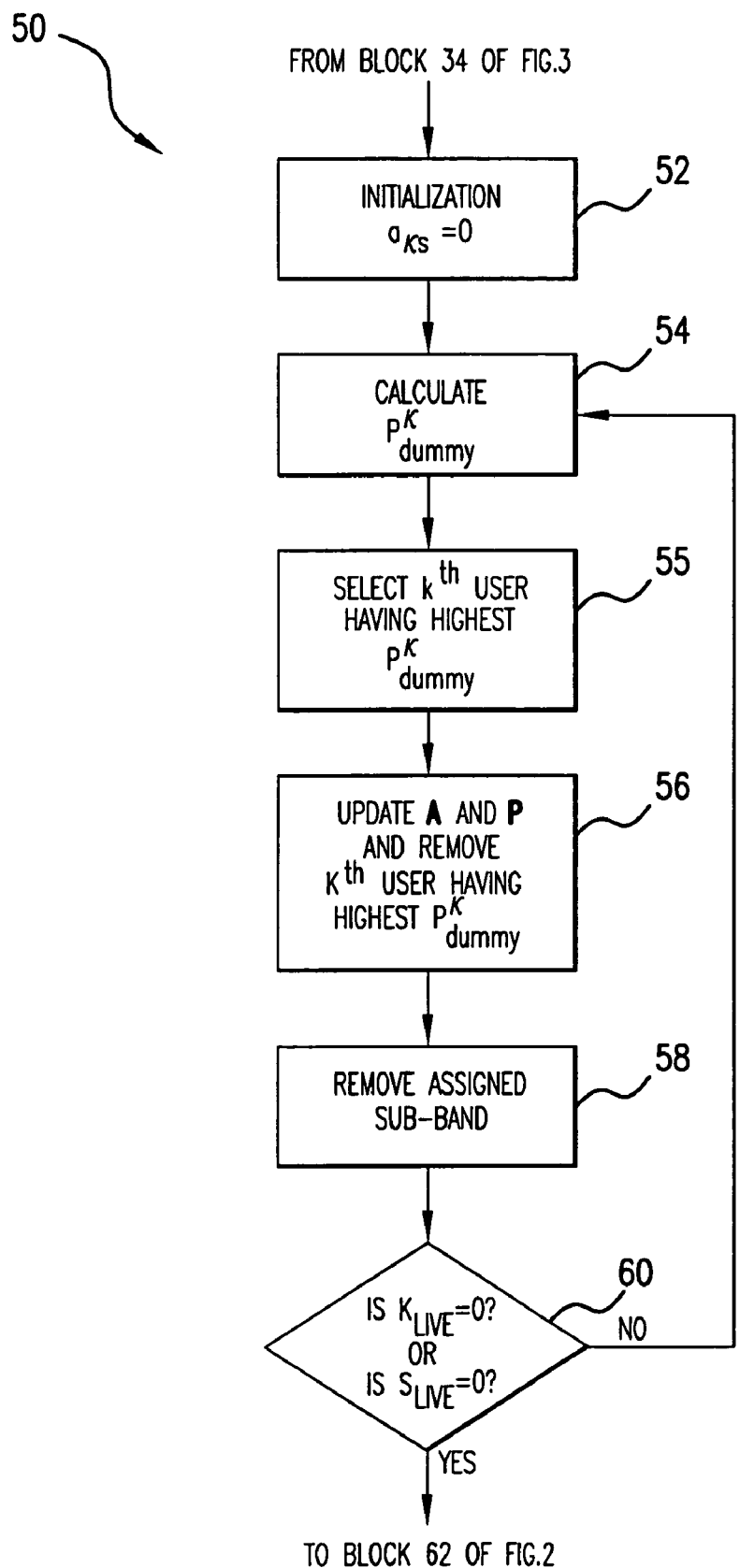
FIG. 4 is a flow-chart block diagram of the suboptimal scheme of the present invention.

After the resource allocation stage 22 performs the sub-band and power allocation using the routine described in the previous paragraphs with respect to either FIG. 3 or FIG. 4, and if there is a feasible solution, then optimization is completed. Otherwise, the outage is reported, indicating the users' requested rates are too high for the current channel conditions. In this case, the logic proceeds to stage 24 where rate adaptation is performed.

Since the transmit power in each sub-band is limited by maximal power $\bar{P}$, solutions to Eq. 24 may not exist in some situations, such as, for example, when the users' requested rates are high but the channel conditions are poor. Under such conditions, some users' desired transmission rates cannot be satisfied, and such a system is "infeasible." When the system is not feasible, and "Outage" is indicated in the block 62, the requested transmission rates must be adapted. For this purpose, the procedure flows to block 66 "Reduce Rate Approach" of the rate adaptation stage shown in FIG. 2 which is capable of obtaining feasible solutions adaptively when the initial system is not feasible for the users' rate requirements.

In the rate adaptation stage 24, the logic in the optimization unit 20 chooses a single user $\hat{k}$ and reduces his/her rate to the next lower rate listed in Table I.

In order to specify which user is to be selected, three different performance goals are considered, namely either maximizing overall transmission rate, achieving proportional fairness, or reducing maximal transmission rate. In particular, given the $k^{th}$ user's data rate $R_k$, his/her one-step reduced rate is denoted by $R_k^-$. For instance, from Table I, the reduced rate $R_k^-$ corresponding to a rate $R_k$=320 Mbps is $R_k^-$=200 Mbps. When the rate $R_k$ reaches the minimum allowable rate of 53.3 Mbps, then $R_k^-$=$R_k$, i.e., the rate $R_k$ is not further reduced. The user $\hat{k}$ whose rate will be reduced can be determined according to the performance goals as:

$$\hat{k} = \begin{cases} \operatorname{argmax}_k R_k^- + \sum_{j=1, j \neq k}^{K} R_j, & \text{Maximizing overall rate;} \\ \operatorname{argmax}_k (R_k^- - R_k^{\min}) \times \prod_{j=1, j \neq k}^{K} (R_j - R_j^{\min}), & \text{Proportional fairness;} \\ \operatorname{argmax}_k (R_k), & \text{Reducing maximal rate;} \end{cases} \quad (25)$$

where $R_k^{min}$ denotes a minimal rate requirement for user k. With the maximizing overall rate approach, the logic passes to block 68, where the overall system rate is maximized in each rate reduction step. In the case of the proportional fairness approach, the procedure flows to block 70, where the product of rates minus minimal rate requirement is maximized. For the reducing maximal rate approach, the highest rate in the system will be reduced in block 72.

Upon determining the candidate user $\hat{k}$ for his/her transmission rate reduction in Block 74 "Choosing user $\hat{k}$", the procedure goes to block 76 "Reduce the $\hat{k}$ user's rate". Upon reduction of the $\hat{k}^{th}$ user transmission rate, the process loops back to the "Sub-Band Assignment and Power Allocation" block 28 to find an optimal (or suboptimal) solution. This procedure may be iteratively repeated for the remaining participating users.

If there is still no solution to the assignment after the transmission rates of all users are reduced to the minimum allowable rate, then an outage is reported. This indicates that the system under the current channel conditions cannot support all K users' transmissions at the same time.

The proposed joint resource allocation and rate adaptation procedure presented in FIG. 2 may be summarized as follows:

1) Given $R_k(n')$, solve sub-band assignment and power allocation problem in Eq. 24;

2) If Eq. 24 has a solution, the algorithm ends. Otherwise,
   If $R_k(n')=R_k^-(n')$, $\forall k$, then an outage is reported and the process ends.
   Solve Eq. 25 to obtain $\hat{k}$.
   Update the rates:

$$R_k(n'+1) = \begin{cases} R_k^-(n'), & k = \hat{k}; \\ R_k(n'), & \text{otherwise.} \end{cases}$$

Set n'=n'+1.

To illustrate the performance of the proposed optimization schemes, simulations are performed for multiband UWB systems with N=128 subcarriers, S=14 sub-bands, and the sub-band bandwidth of 528 MHz. Following the IEEE 802.15.3a standard proposal (A. Batra et al., "Multi-Band OFDM Physical Layer for IEEE 802.15 Task Group 3a", IEEE P802.15-03/268r3 March 2004), the sub-bands with center frequencies 2904+528×$n_b$ MHz, $n_b$=1, 2, ..., 14 are utilized.

The OFDM symbol has a duration $T_{FFT}$=242.42 ns. After adding the cyclic prefix of length $T_{CP}$=60.61 ns and the guard interval of length $T_{GI}$=9.47 ns, the symbol duration becomes $T_{SYM}$=312.5 ns. The maximum transmit power is −41.3 dBm/MHz, and the PER is maintained such that PER <8% for a 1024 byte packet. The average noise power follows Eq. 8 with $N_F$=6.6 dB, and the propagation loss factor is ν=2.

A multiuser scenario is considered in which each user is located at a distance of less than 4 meters from the central base station. Performance is evaluated in multipath channel environments specified in the IEEE 802.15.3a channel modeling sub-committee report (J. R. Foerster, V. Somayazulu, S. Roy, "A Multibanded System Architecture for Ultra-Wideband Communications," IEEE Conf. on Military Commun., vol 2, pp. 903-908, Oct. 13-16, 2003). The channel models are employed which are based on channel measurements over the range of 0-4 meters.

A. Sub-Band Assignment and Power Allocation

In this subsection, the average transmit power and the outage probability curves are presented for multiband UWB systems. The outage probability is denoted as the probability that the requested rate cannot be supported under the constraints in Eq. 24. The performances of the proposed scheme are compared with those of the current multiband scheme in the standards proposal (A. Batra, et al., "Multi-Band OFDM Physical Layer Proposal for IEEE 802.15 Task Group 3a," IEEE P802.15-03/268r3. March 2004).

Figure 5A:
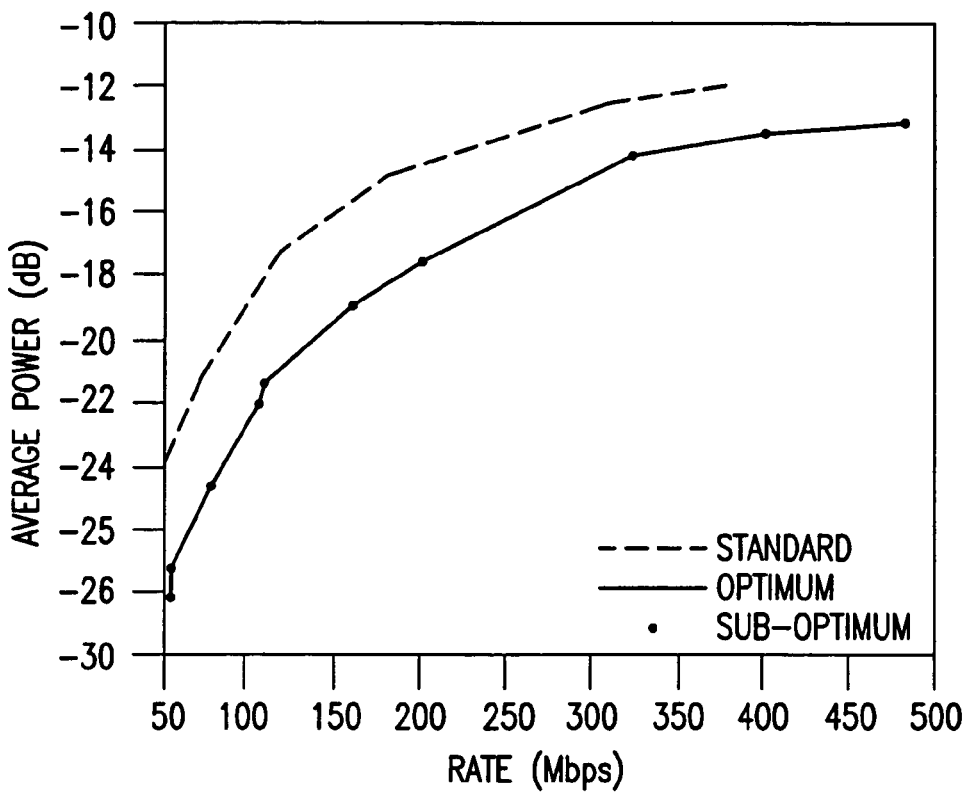
FIGS. 5a and 5b are diagrams showing, respectively, average power vs. rates and outage probability vs. rates.
Figure 5B:
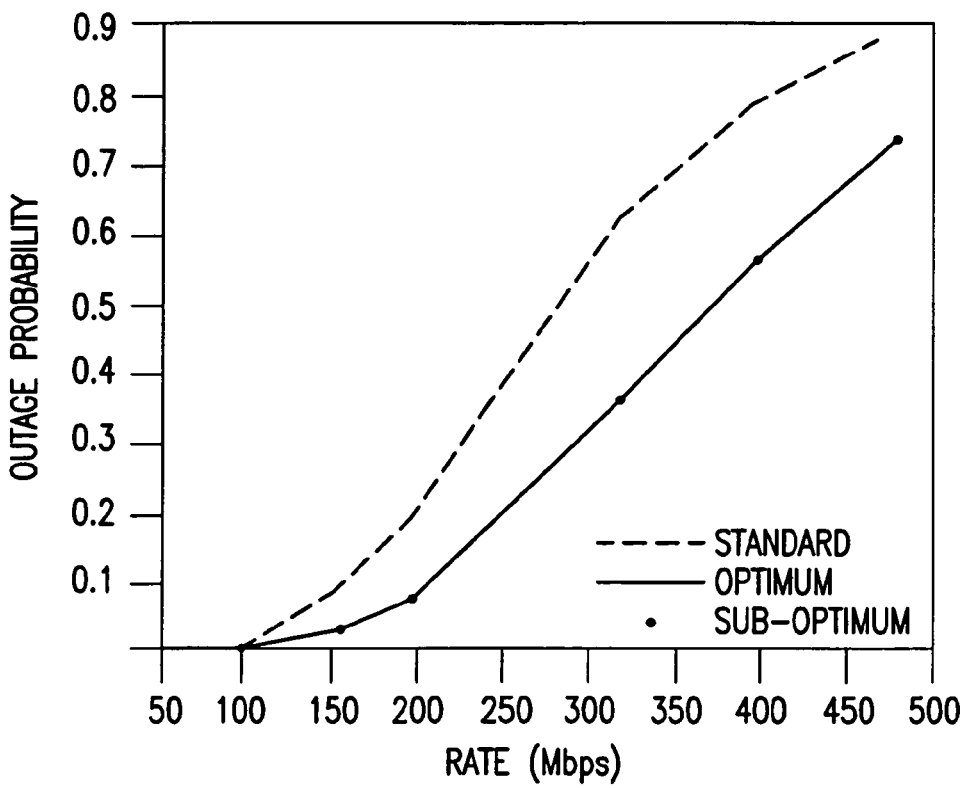

For FIGS. 5a and 5b, the number of users is fixed to K=3, while each user is randomly located at the distance of 1 to 4 meters from the base station. In FIG. 5a, the average transmit power is illustrated as a function of the transmission rates for standard multiband scheme, the proposed fast suboptimal scheme, and the optimal scheme obtained by a full search. It is apparent that the proposed optimization procedure greatly reduces the average transmit power as compared to that in a prior art approach. In addition, the proposed fast optimization can achieve almost the same performance as the optimal scheme. The results show that both fast suboptimal and optimal approach can reduce about 60% of average transmit power at low rates (53.3-200 Mbps) and up to 35% at high rates (320-480 Mbps). The curves are not smooth due to the discrete nature of the problem.

FIG. 5b shows the outage probability versus the transmission rates for standard multiband scheme, the proposed fast suboptimal scheme, and the optimal scheme obtained by a full search. As it may be seen, all three schemes have non-zero outage probability when the rate is higher than 200 Mbps. This is due to the fact that the system under current channel conditions cannot support such rates within the established constraints. In these cases, the proposed suboptimal scheme achieves lower outage probability than that of the standard multiband scheme for all rates. Significant performance difference can be observed at high rates. For instance, at 320 Mbps, the outage probability of the proposed scheme is 0.36, whereas that of the standard multiband scheme is 0.64.

Figure 6A:
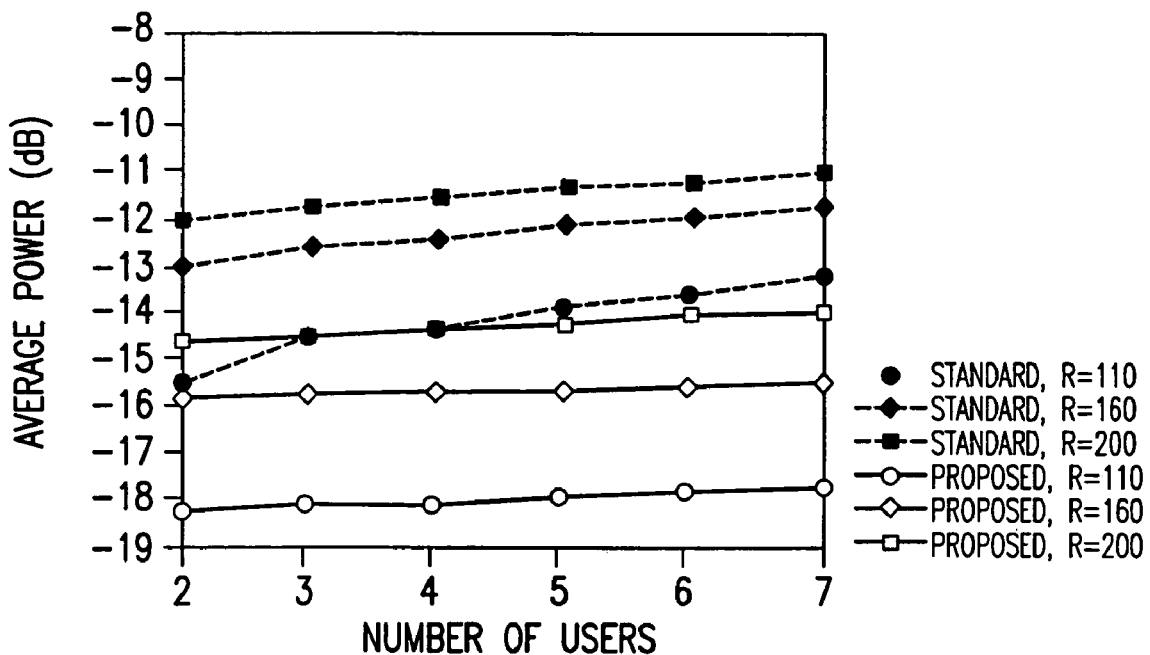
FIGS. 6a and 6b are diagrams showing, respectively, relationship between average power vs. number of users and outage probability vs. number of users.
Figure 6B:
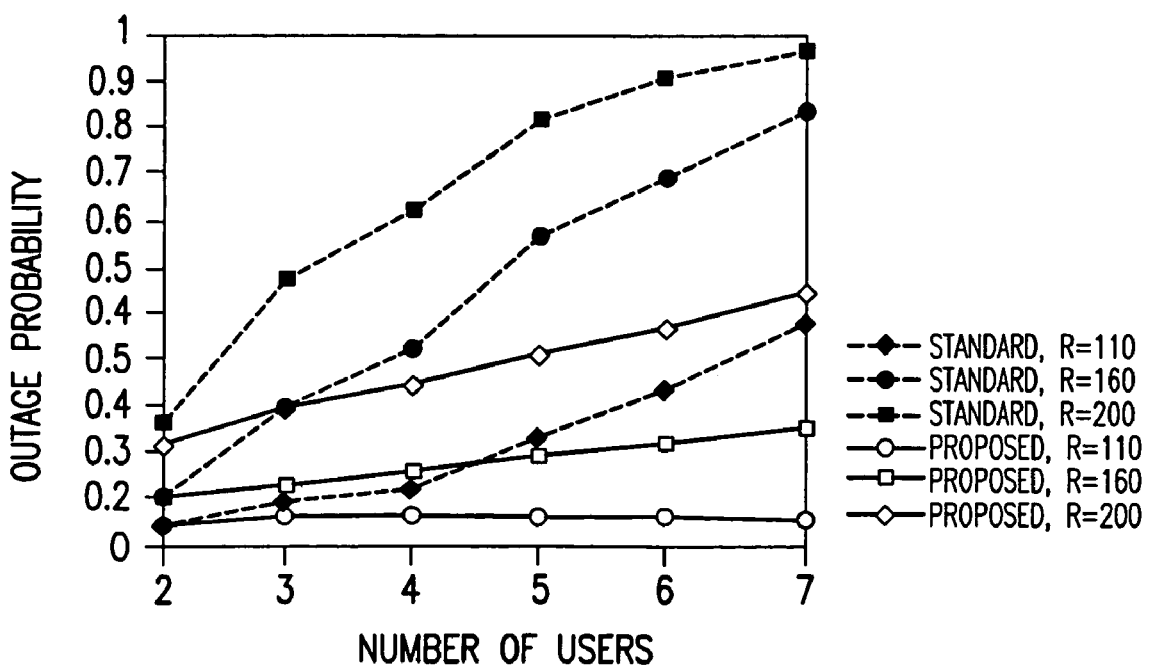

A multiuser system with a different number of users is also considered, wherein each user is located at a fixed position of about 4 meters from the base station. Specifically, the distance between the $k^{th}$ user and the base station is specified as $d_k$=4−0.1 (k=1, 2, ..., K. In FIGS. 6a and 6b, the average transmit power and outage probability are shown, respectively, as functions of the number of users for the transmission rates of 110, 160, and 200 Mbps. In both FIGS. 6a, 6b, the standard multiband scheme and the suboptimal schemes are used. As seen in FIG. 6a, the transmit power increases with the number of users. This results from the limited available sub-bands with good channel conditions. When the number of users is large, some users have to occupy the sub-bands with worse channel conditions. Comparing the proposed suboptimal scheme with standard multiband approach, it is seen that the subject application scheme achieves lower transmit power for all the rate requirements.

FIG. 6b shows that the outage probability increases with the number of users, especially when the desired rate is high. This is due to the fact that as the number of users increases, the system is more crowded and it may not be feasible to support all of the users at all times. It is observed, that at any rate, when the performance of the standard multiband scheme is employed, the effect of the number of users to the outage probability is insignificant when the rates are not higher than 160 Mbps. The proposed optimization routine achieves smaller outage probabilities than those of the standard scheme of the prior art under all conditions.

B. Joint Rate Assignment and Resource Allocation

This subsection illustrates the performances of the proposed joint rate assignment and resource allocation algorithm for the multiband system. A multiuser system is considered with different numbers of users. Each user is randomly located at the distance of 1 to 4 meters from the base station. The users' requested rates are also randomly selected from the set {200, 320, 400, 480} Mbps, and the minimum rate requirement is $R_k^{min}$=50 Mbps $\forall$k for proportional fairness goal. The joint rate assignment and resource allocation routine is performed for each set of requested rates and channel conditions.

Figure 7:
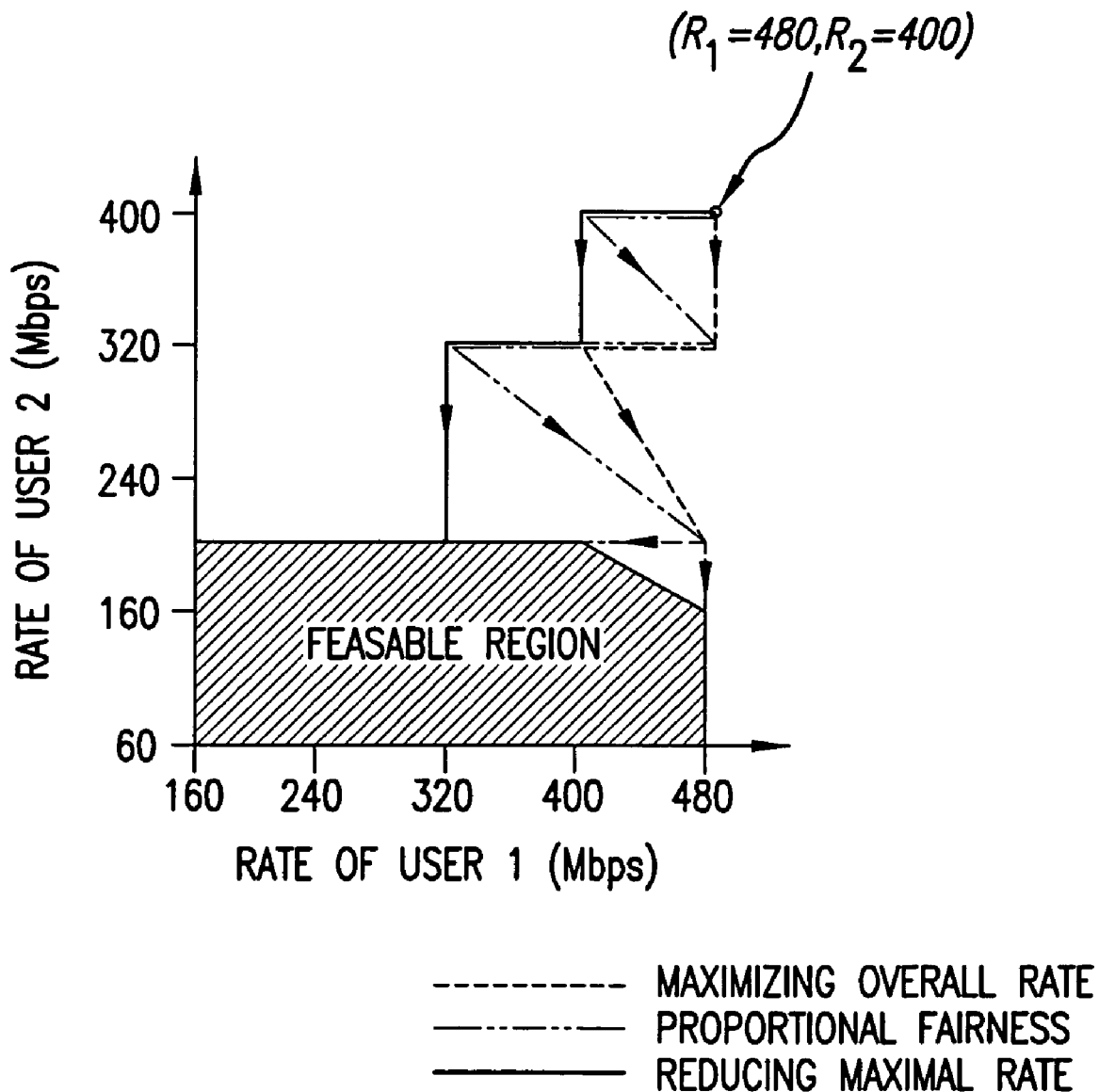
FIG. 7 is a diagram illustrating the realization of the rate adaptation for a two-user system, in accordance with three different performance goals.

FIG. 7 illustrates an example of the rate adaptation for a two-user system with three different performance goals. The shaded area represents the feasible range of the transmission rates $R_1$ and $R_2$ in the current channel conditions. In this example, the requested rates are $R_1$=480 and $R_2$=400 Mbps, and both users are located approximately 4 meters from the base station. It may be observed from FIG. 7, that the reducing maximal rate approach has the lowest overall rate in every adaptation step. This is due to the fact that the highest rate in the system is always reduced. On the other hand, the maximizing overall rate approach tends to reduce the lower rate since most low rates have smaller decreasing step size than high rates. Although the maximizing overall rate approach always yields superior system performance, it is unfair to those applications with low data rates. The proportional fairness goal provides the performance that is between the maximizing overall approach and reducing maximal rate approach.

Figure 8A:
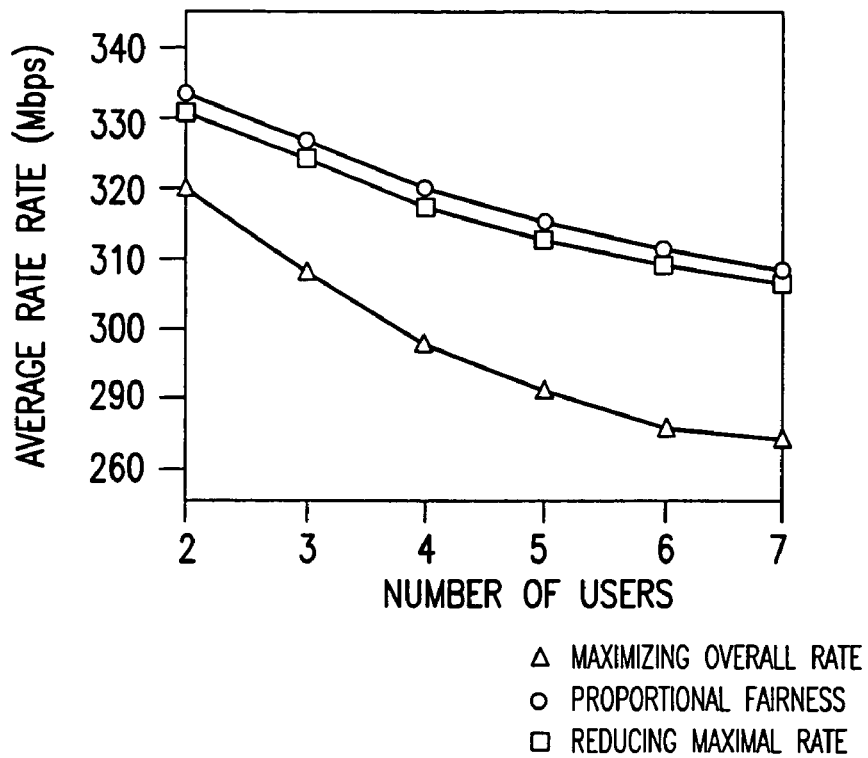
FIGS. 8a and 8b are diagrams showing, respectively, average rate vs. number of users and standard deviation vs. number of users for three performance goals.
Figure 8B:
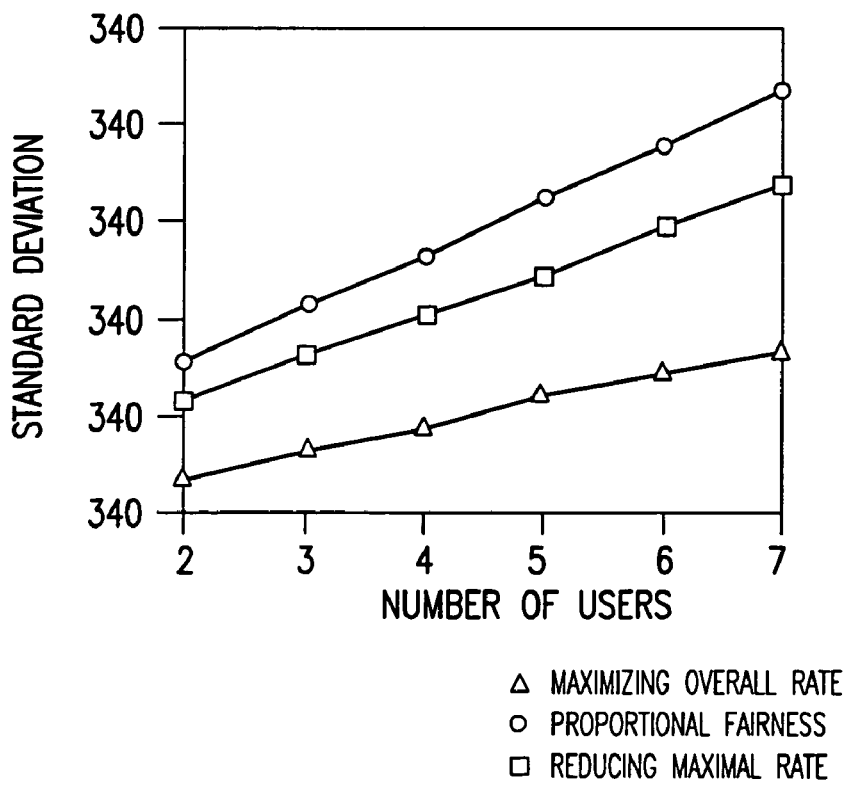

FIG. 8a-8b show the average system performance versus the number of users. In FIG. 8a, the performances are presented in term of the average users' information data rates. It may be seen that the average rates of all three approaches (maximizing overall rate, proportional fairness, and reduction of maximal rate) decrease when the number of users increases. This is due to the limited sub-bands with good channel conditions. As the number of users increases, some users need to occupy sub-bands with poor channel conditions, and hence their feasible rates tend to be lower than the requested rates. Comparing the performances of three approaches, it is concluded that the proportional fairness yields a slightly lower average rate than that of the maximizing overall rate approach, and both proportional fairness and maximizing overall rate approaches achieve much higher rates than that of the reducing maximal rate approach.

In FIG. 8b, the standard deviations of the users' transmitted data rates for three approaches are shown. Here the standard deviation represents the fairness of allocation among users. It may be observed that the standard deviation for every scheme increases with the number of users since for the larger number of users, the variation of the rates is higher. At any fixed number of users, the reduction maximal rate approach results in the smallest standard deviation. The standard deviation slightly increases with the number of users. This is because the feasible rates obtained from the reducing maximal rate approach are close to each other. In contrast, the maximizing overall rate scheme can yield feasible rates of around 100 to 480 Mbps at the same time. Thus, its standard deviation increases much faster with the number of users. The standard deviation of proportional fairness approach is between the other two schemes. Therefore, the proportional fairness approach is a tradeoff between the maximal rate approach and reducing maximal rate approach for both performances and fairness.

Low power consumption is one of the key elements to make multiband UWB technology a feasible and useful the solution for future indoor wireless communications. The novel efficient cross layer scheme for allocating sub-band and power among users in a multiband UWB system aims to reduce power consumption without compromising performance which results in much lower co-channel interference and a substantial increase in battery life. A general framework is described to minimize the overall transmit power under the practical implementation constraints. The optimization routine is N P hard; however, using the novel fast suboptimal scheme, computational complexity is reduced to only O ($K^2$S), where K is the number of users and S is the number of sub-bands in the UWB system. Simulation results show that the proposed suboptimal scheme achieves comparable performances to those of the complex full search optimization, and can save up to 61% of power consumption compared to the standard multiband scheme. Moreover, the suboptimal scheme is capable of obtaining the feasible solutions adaptively when the initial system is not feasible for the users' rate requirements. Among three different system optimization goals used in the proposed rate adaptation algorithm, the proportional fairness approach turns out to be a tradeoff between the maximal rate approach and reducing maximal rate approach for both performance and fairness.

Although this invention has been described in connection with specific forms and embodiments thereof, it will be appreciated that various modifications other than those discussed above may be resorted to without departing from the spirit or scope of the invention as defined in appended claims. For example, equivalent elements may be substituted for those specifically shown and described, certain features may be used independently of other features, and in certain cases, particular locations of elements may be reversed or interposed, all without departing from the spirit or scope of the invention as defined in the appended claims.

What is claimed is:

1. A method for power efficient channel allocation in a multi-band multi-user ultra-wideband (UWB) system, including a plurality of K users, a plurality of S sub-bands, and an integer plurality of N sub-carriers, wherein each $k^{th}$ of said plurality of K users requests transmission with a data transmission rate $R_k$, including the steps of:
   providing a system, said system having a processor, wherein said system includes distinct modules, and wherein said distinct modules include a sub-band assignment module, a power allocation module, a calculating module, and an adapting module;
   defining a sub-band assignment matrix A including a plurality of $a_{ks}$ elements, wherein k=1, 2, ..., k, and s=1, 2, ..., S, said $a_{ks}$ represents the duration of a data packet which the $k^{th}$ user is allowed to transmit on the $s^{th}$ sub-band, wherein said defining a sub-band assignment matrix is performed by said sub-band assignment module;
   establishing a power allocation matrix P including a plurality of $P_k^s$ elements, each $P_k^s$ representing the transmit power of the $k^{th}$ user at each sub-carrier of the $s^{th}$ sub-band, wherein said establishing a power allocation matrix is performed by said power allocation module;
   calculating said sub-band assignment matrix A and said power allocation matrix P under pre-defined constraints to allocate the users' transmissions to respective sub-bands, thereby minimizing the overall transmit power in said UWB system, wherein said calculating is performed by said calculating module; and,
   adapting said sub-band assignment matrix A and said power allocation matrix P to said respective sub-bands' conditions, if said allocation of the users' transmissions to said respective sub-bands deviates from a predetermined allocation criteria, wherein said adapting is performed by said adapting module.

2. The method of claim 1, further comprising the steps of:
   assigning a respective sub-band to a respective one of said plurality of K users, including the steps of:
   (a) setting said sub-band assignment matrix $A=0_{k \times s}$;
   (b) defining user optimization list $K_{live}=\{1, 2, ..., K\}$;
   (c) defining sub-band optimization list $S_{live}=\{1, 2, ..., S\}$;
   (d) calculating a dummy overall transmission power $P_{dummy}^k$ for each $k^{th}$ user of said plurality of k users wherein $P_{dummy}^k = \min \Sigma_{s=1}^S a_{ks} P_k^s$, $s \in S_{live}$;
   (e) assigning said respective sub-band to a user k with the highest $P_{dummy}^k$, and removing said user k from said user optimization list $K_{live}$;
   (f) removing said assigned respective sub-band from said sub-band optimization list $S_{live}$;
   (g) repeating said steps (d) (f) for remaining users in said user optimization list $K_{live}$, until said $K_{live}=0$, thereby assigning transmissions of said plurality K of the users to said plurality of S sub-bands in said sub-band optimization list $S_{live}$; and
   (h) comparing a transmit power for each assigned sub-band to a pre-determined maximum power value.

3. The method of claim 2, further comprising the steps of:
   indicating an outage if the transmit power for said each assigned sub-band is larger than said pre-determined maximum power value; and
   adapting said requested data transmission rate $R_k$ of at least one user of said plurality of K users.

4. The method of claim 3, further comprising the steps of:
   (i) in said step of said requested data transmission rate $R_k$ adaptation, choosing a single $k^{th}$ user,
   (j) reducing said single $k^{th}$ user's data transmission rate to a one-step reduced data transmission rate $R_k^-$;
   (k) repeating said steps (d)-(h); and
   (l) repeating said steps (i)-(k) for the remaining users in said plurality of K users.

5. The method of claim 4, further comprising the steps of:
   choosing said $\overline{k}^{th}$ users in accordance with performance goals, including:

$$\hat{k} = \begin{cases} \operatorname{argmax}_k R_k^- + \sum_{j=1, j \neq k}^{K} R_j, & \text{Maximizing overall rate;} \\ \operatorname{argmax}_k (R_k^- - R_k^{\min}) \times \prod_{j=1, j \neq k}^{K} (R_j - R_j^{\min}), & \text{Proportional Fairness;} \\ \operatorname{argmax}_k (R_k), & \text{Reducing maximal rate;} \end{cases}$$

wherein $R_k^{min}$ denotes a minimal requested data transmission rate for the $\overline{k}^{th}$ user.

6. The method of claim 2, further comprising the step of:
   indicating on outage if $S_{live}=0$ and $K_{live} \neq 0$.

7. The method of claim 2, further comprising the step of:
   accepting said calculated sub-band assignment matrix A and said power allocation matrix P as optimal if said transmit power for each said assigned sub-band does not exceed said pre-determined maximum power value.

8. The method of claim 1, wherein said pre-defined constraints include packet error rate, data transmission rates, and maximal allowed transmit power.

9. The method of claim 1, further comprising the step of:
   performing a time-domain spreading with a pre-determined time-frequency code of a pre-determined length if said requested $R_k$ is below a pre-determined data transmission rate value.

10. The method of claim 1, wherein said UWB system employs Orthogonal Frequency Division Multiplexing (OFDM) with said integer plurality of N sub-carriers modulated by the quadrature phase shift keying (QPSK), wherein at each OFDM symbol period, a modulated said OFDM symbol is transmitted over one of said S sub-bands in time-interleaved fashion across said S sub-bands.

11. The method of claim 1, further comprising the step of:
   defining a value range for each $a_{ks}$ depending of the data transmission rate $R_k$ of each $k^{th}$ user from said plurality of K users.

12. The method of claim 11, wherein $$a_{ks} \in \phi(R_k) = \begin{cases} \{0, 1\}, & R_k \leq 200 \text{ Mbps;} \\ \{0, 1, 2\}, & R_k > 200 \text{ Mbps.} \end{cases}$$

13. The method of claim 1, further comprising the step of:
   assigning each sub-band from said plurality of S sub-band to a respective user of said plurality of K users at a transmission event to minimize a multiple access interference.

14. The method of claim 1, further comprising the step of:
   defining a value range for each $a_{ks}$ depending of the duration of a transmission block.

15. The method of claim 1, further comprising the steps of:
   deriving an average signal-to-noise ratio (SNR) $\overline{\Gamma}_k$ in accordance with $$\Gamma_k = \sum_{s=1}^{S} a_{ks} P_k^s F_k^s,$$

where $$F_k^s \triangleq \frac{b_k}{N\sigma_k^2} \sum_{n=0}^{N-1} G_k^s(n)$$

wherein $b_k$ is a constant depending on the $k^{th}$ user transmission rate, $G_k^s(n)$ is a channel gain and $\sigma_k^2$ is a noise power at each subcarrier;

establishing a threshold value $\epsilon$ for packet error rate (PER), and maintaining said average SNR above a predetermined SNR threshold in accordance with $$\Gamma_k = \sum_{s=1}^{S} a_{ks} P_k^s F_k^s \geq \gamma(\varepsilon, R_k)$$

to insure said PER is below said threshold value $\epsilon$.

16. A method for power controlled optimization of channel allocation in multi-band multi-user ultra-wideband (UWB) system for transmitting packets from a plurality of K users at a plurality of S sub-bands using an integer plurality of N sub-carriers, each $k^{th}$ user requesting a data transmission rate $R_k$, the method comprising the steps of:
    (a) providing a system, said system having a processor, wherein said system includes distinct modules, and wherein said distinct modules include an assignment module, an initialization module, a calculating module, and a comparing module;
    (b) defining a sub-band assignment matrix A, including a plurality of $a_{ks}$ elements, wherein k=1, 2, ..., K, and s=1, 2, ..., S, and wherein each said $a_{ks}$ element represents the duration of a data packet which a $k^{th}$ user of said plurality of K users is allowed to transmit on the $S^{th}$ sub-band of said plurality of S sub-bands, wherein said defining a sub-band assignment matrix is performed by said initialization module,
    (c) setting $A=0_{K\times S}$, wherein said setting is performed by said initialization module;
    (d) defining user optimization list $K_{live}=\{1, 2, ..., K\}$, wherein said defining is performed by said initialization module;
    (e) defining sub-band optimization list $S_{live}=\{1, 2, ..., S\}$, wherein said defining is performed by said initialization module;
    (f) calculating a dummy overall transmission power $P_{dummy}^k$ for each $k^{th}$ user of said plurality of k users, wherein $P_{dummy}^k = \min \Sigma_{s=1}^S a_{ks} P_k^s$, $s \in S_{live}$ and said calculating a dummy overall transmission power is performed by said calculating module;
    (g) assigning said respective sub-band to a user k with the highest $P_{dummy}^k$, and removing said user k from said user optimization list $K_{live}$ wherein said assigning is performed by said assigning module;
    (h) removing said assigned respective sub-band from said sub band optimization list $S_{live}$, wherein said removing is performed by said assigning module;
    (i) repeating said steps (f)-(h) for the remaining users in said user optimization list $K_{live}$, until said $K_{live}=0$, thus assigning transmissions of said plurality of K users to the said plurality of S sub-bands in said sub-band optimization list $S_{live}$; and
    (j) comparing a transmit power for each assigned sub-band to a pre-determined maximum power value, wherein said comparing is performed by said comparing module.

17. The method of claim 16, further comprising the steps of:
    indicating an outage if the transmit power for said each assigned sub-band is larger than said pre-determined maximum power value, or if $S_{live}=0$ and $K_{live}\neq 0$; and
    adapting said requested data transmission rate $R_k$.

18. The method of claim 17, further comprising the steps of:
    (k) in said step of said requested data transmission rate $R_k$ adaptation, choosing a single $k^{th}$ user,
    (l) reducing said single $k^{th}$ user's data transmission rate to a one-step reduced data transmission rate $R_k$, and repeating said steps (f)-(j); and
    (m) repeating said steps (k)-(l) for remaining users in said plurality of K users.

19. The method of claim 17, further comprising the steps of:
    choosing said single user in accordance with performance goals, including:
    maximizing overall rate, or considering proportional fairness, or reducing maximal rate.

20. A multi-user multi-band ultra-wide band (UWB) system with an efficient sub-band assignment and power allocation, the UWB system transmitting data packets from a plurality of K users at a plurality of S sub-bands using an integer plurality of N sub-carriers using Orthogonal Frequency Division Multiplexing (OFDM), the system comprising:
    a sub-band assignment matrix A, including a plurality of $a_{ks}$ elements, wherein k=1, 2, ..., K, and S=1, 2, ..., S, and wherein each said $a_{ks}$ element represents the duration of a data packet which a $k^{th}$ user of said plurality of K users is allowed to transmit on the $S^{th}$ sub-band and said plurality of S sub-bands,
    a user optimization list $K_{live}=\{1, 2, ..., K\}$;
    a sub-band optimization list $S_{live}=\{1, 2, ..., S\}$; and
    a processor unit adapted for:
    (a) iterative calculation of a dummy overall transmission power $P_{dummy}^k$ for each $k^{th}$ user of said plurality of k users wherein $P_{dummy}^k = \min \Sigma_{s=2}^S a_{ks} P_k^s$, $s \in S_{live}$;
    (b) assignment of said $s^{th}$ sub-band to a user k with the highest $P_{dummy}^k$, and removal of said user k from said user optimization list $K_{live}$;
    (c) removal of said assigned respective sub-band from said sub-band optimization list $S_{live}$;
    (d) repetition of said steps (a)-(c) for remaining users in said user optimization list $K_{live}$, until said $K_{live}=0$, thus assigning transmissions of said plurality of the K users to said plurality of S sub-bands in said sub-band optimization list $S_{live}$; and
    (e) comparison of a transmit power for each assigned sub-band to a pre-determined maximum power value;
    said processor unit indicating an outage if the transmission power for said each assigned sub-band is larger than said pre-determined maximum power value or if $S_{live}=0$ and $K_{live}\neq 0$; and
    reducing said requested data transmission rate $R_k$ for a chosen at least one user of said plurality of K users.

* * * * *